United States Patent
Kenny

(10) Patent No.: US 7,994,448 B2
(45) Date of Patent: Aug. 9, 2011

(54) MATERIALS RECOVERY FACILITY PROCESS OPTIMIZATION VIA UNIT OPERATION FEEDBACK

(75) Inventor: Garry R. Kenny, West Linn, OR (US)

(73) Assignee: MSS, Inc., Nashville, TN (US)

( * ) Notice: Subject to any disclaimer, the term of this patent is extended or adjusted under 35 U.S.C. 154(b) by 498 days.

(21) Appl. No.: 12/109,213

(22) Filed: Apr. 24, 2008

(65) Prior Publication Data

US 2008/0197058 A1 Aug. 21, 2008

Related U.S. Application Data

(62) Division of application No. 11/194,709, filed on Aug. 1, 2005, now Pat. No. 7,893,378.

(60) Provisional application No. 60/600,206, filed on Aug. 10, 2004.

(51) Int. Cl.
*B07C 5/00* (2006.01)
(52) U.S. Cl. .................................. 209/576; 209/930
(58) Field of Classification Search ............... 209/509, 209/520, 671, 672, 930
See application file for complete search history.

(56) References Cited

U.S. PATENT DOCUMENTS

| | | | |
|---|---|---|---|
| 3,888,351 A | 6/1975 | Wilson | |
| 4,088,227 A | 5/1978 | Lockett | |
| 4,912,624 A | 3/1990 | Harth et al. | |
| 5,333,738 A | 8/1994 | Fuchs et al. | |
| 6,115,644 A | 9/2000 | Petty et al. | |
| 6,143,183 A | 11/2000 | Wardwell et al. | |
| 6,409,105 B1 | 6/2002 | Griebat et al. | |
| 6,460,706 B1* | 10/2002 | Davis | 209/672 |
| 6,648,145 B2* | 11/2003 | Davis et al. | 209/672 |
| 7,014,824 B2* | 3/2006 | Krodel et al. | 423/210 |
| 7,264,124 B2 | 9/2007 | Bohlig et al. | |
| 7,341,156 B2 | 3/2008 | Bohlig et al. | |
| 7,383,195 B2* | 6/2008 | Mallett et al. | 705/308 |
| 2004/0159593 A1* | 8/2004 | Allen et al. | 209/606 |
| 2006/0070851 A1 | 4/2006 | Marisy et al. | |
| 2008/0237093 A1 | 10/2008 | Bohlig et al. | |

OTHER PUBLICATIONS

Co-Pending U.S. Appl. No. 12/038,301, filed Feb. 27, 2008, to Garry R. Kenny (not prior art).
Co-Pending U.S. Appl. No. 12/109,202, filed Apr. 24, 2008, to Garry R. Kenny (not prior art).

* cited by examiner

*Primary Examiner* — Joseph C Rodriguez
*Assistant Examiner* — Kalyanavenkateshware Kumar
(74) *Attorney, Agent, or Firm* — Waddey & Patterson, P.C.; Lucian Wayne Beavers

(57) ABSTRACT

Methods and systems are provided for controlling an automatic separator apparatus of a Materials Recovery Facility. A separator for separating a stream of recyclable paper and containers into a paper stream including primarily paper and a container stream including primarily containers is provided. The separator has at least one adjustable operating parameter. A first detector detects an amount of container contaminants in the paper stream. A second detector detects an amount of paper contaminants in the container stream. A control system operably connected to the separator and the first and second detectors adjust the adjustable operating parameter so as to reduce a combined measure of contaminants in the paper stream and in the container stream.

7 Claims, 7 Drawing Sheets

MATERIALS RECOVERY FACILITY PROCESS OPTIMIZATION VIA UNIT OPERATION FEEDBACK

This application is a divisional of U.S. patent application Ser. No. 11/194,709 filed Aug. 1, 2005, which claims benefit of U.S. Provisional Patent Application No. 60/600,206, filed Aug. 10, 2004, entitled "Materials Recovery Facility Process Optimization Via Unit Operation Feedback". The details of both referenced applications are incorporated herein by reference.

BACKGROUND OF THE INVENTION

1. Field of the Invention

The present invention relates generally to the field of sorting of recycled materials, and more particularly, but not by way of limitation, to methods and apparatus for optimizing the operation of an adjustable sorting apparatus or sorting system.

2. Description of Prior Art

Materials Recovery Facilities (MRFs) have been receiving and processing recyclable materials for the past 25 years. The recyclable material normally consists of newspaper, plastic bottles, steel and aluminum cans, and sometimes glass bottles and fragments. The newspaper stream was typically kept separate from the containers. During the first five to ten years the processing typically involved conveying the recyclables under a magnet to remove the steel, then past an air stream to separate the plastic and aluminum cans from the glass bottles. The rest of the components were then sorting manually by hand.

In the mid 1980s eddy current separators were introduced to automatically remove the aluminum from the plastic bottle and aluminum can stream. Then in the mid 1990s separation modules became available to separate the plastic bottles by resin type and by color. These separators did not, however, begin use in MRFs until around 1998. At about the same time the first system to automatically sort office paper was introduced by the assignee of the present invention (MSS, Inc.) in collaboration with Weyerhaeuser Company. An example of those systems is seen in U.S. Pat. No. 6,250,472 to Grubbs et al., assigned to assignee of the present invention and the details of which are incorporated herein by reference.

Mechanical screens saw limited use in MRFs until the late 1990s when the first cardboard screens were introduced. These screens were used to remove oversize cardboard from the newspaper stream. With the introduction of so called "single stream" collection in the late 1990s, however, screen technology was improved to address sorting of containers (i.e. plastic and glass bottles and metal cans) from the mixed paper and cardboard stream.

The first generation of screens involved either one or two flat bed screen "decks" which were inclined in the direction of motion of the material. The screens themselves were comprised of a number of discs attached to rotating shafts. In operation, the more 3 dimensional materials such as containers would tend to roll or bounce down the screen deck while more 2 dimensional materials such as newspaper and cardboard would go up and over the top of the screen. An example of inclined flat bed rotary disc screens is seen in U.S. Pat. No. 6,250,472 to Grubbs et al.

This screen technology evolved to where the angle of the screen, as well as the rotor speed, was adjustable to compensate for differing material composition and moisture content. The latest generation screen patented by CP Manufacturing is in the shape of a wide bottom V, with the entire V bottom tilted from horizontal. This screen has additional adjustable settings with include not only the rotor speed and tilt angle of the V sides, but also the tilt angle of the entire V. In this screen the paper is propelled by the discs up and over each side of the V. The containers roll back from the sides of the V and migrate down the bottom of the V in the direction of the tilt. Examples of such V shape rotary disc separators are seen in U.S. Pat. No. 6,460,706 to Davis and U.S. Pat. No. 6,648,145 to Davis et al., the details of which are incorporated herein by reference.

Unfortunately, however, very few MRF operators are capable of determining the optimum operating parameters for these new screens. Experience in MRFs also shows that even when the screens are properly set for a certain mixture of recyclables and moisture content, that setting is only good for a matter of a few minutes as the composition and moisture content changes.

FIG. 1 schematically illustrates the flow of material through a typical prior art Materials Recovery Facility (MRF) generally designated by the numeral 10. An input waste material stream 12 enters the MRF 10. As indicated at block 14 oversized and non-recyclable objects are removed by hand.

As indicated at block 16 a screening device may be used to separate large cardboard items which go to a cardboard destination 18. The bulk of the material which is made up typically of containers of various types and newspaper goes to a mechanical screening device 20 which separates the newspaper from the containers. The mechanical screening device 20 may for example be an adjustable angle trough-shaped screen such as those shown for example in U.S. Pat. Nos. 6,648,145 and 6,460,706.

The screening device 20 separates the material stream into a first stream or paper stream 22 which includes some containers, and a second stream or container stream 24 which includes some paper.

Typically the paper stream 22 is hand sorted as indicated at block 25 into a container destination 26, a paper destination 28, a contaminant destination 30, and with ferrous and aluminum materials directed to destinations 34 and 44, respectively.

The container stream 24 from separator 20 then passes through a magnetic separator 32 which removes ferrous items into a ferrous metal stream 34. The container stream continues at 36 to a hand sorting location 38 where newspaper is removed at 40 and returned to the newspaper destination 28, and the containers are hand sorted into plastic containers which go to destination 42 and aluminum containers which go to destination 44.

The plastic containers at destination 42 are then again hand sorted as indicated by block 46 into PET (Polyethylene Terephalate) containers to destination 48, colored HDPE (High Density Polyethylene) to destination 50, and natural HDPE (High Density Polyethylene) to destination 52.

What is needed then is a way to optimize the screen parameter settings and to modify those settings in real time as the composition and moisture content of the feedstream changes continuously. Even when set optimally the screens are not 100% effective. Containers (particularly flat ones) are sometimes carried over with the paper fraction, and as well some paper is carried along with the containers.

What is also needed is a way to optimize all of or a portion of a Materials Recovery Facility which includes one or more adjustable screens.

SUMMARY OF THE INVENTION

In one embodiment the invention provides a method of sorting recycled materials including providing an input stream of recycled materials wherein a composition of the input stream is subject to variation during a time interval, moving the input stream through a separator machine having a plurality of adjustable machine operating parameters, adjusting via a computerized control system a first one of the adjustable machine operating parameters while monitoring with the computerized control system a quality of separation achieved by the separator machine so as to select a value of the first parameter that improves the effect of the first parameter on the monitored quality of separation, then adjusting a second one of the adjustable machine operating parameters while monitoring the quality of separation achieved by the separator machine so as to select a value of the second parameter that improves the effect of the second parameter on the monitored quality of separation, and then repeating the adjusting steps with the computerized control system during the time interval so that the effects of the adjustable machine operating parameters are repeatedly automatically adjusted as the composition of the input stream varies during the time interval.

In another embodiment the present invention provides a method of sorting an input waste material stream including a mixture of first and second materials. The method includes passing said input waste material stream through an adjustable separator having at least one adjustable parameter and separating said input waste material stream into a first output stream containing the majority of said first material and some contaminant second material, and a second output stream containing the majority of said second material and some contaminant first material. The method includes adjusting the adjustable parameter and monitoring the amount of contaminant second material in said first output stream and the amount of contaminant first material in said second output stream both before and after the adjustment, and generating a signal indicative of whether the combined amount of contaminant material has decreased. The adjustable parameter is then further adjusted responsive to said signal in a direction indicated as being favorable to decreasing the combined amount of contaminant material in the first and second output streams.

In another embodiment the invention provides a separator system including a separator for separating a stream of recyclable material and containers into a paper stream including primarily paper and a container stream including primarily containers. The separator has at least one adjustable parameter. The system includes a first detector for detecting an amount of container contaminants in the paper stream and a second detector for detecting an amount of paper contaminants in the container stream. The system includes a control system operably connected to the separator and to the first and second detectors for adjusting the adjustable operating parameters so as to reduce a combined measure of contaminants in the paper stream and in the container stream.

In another embodiment the present invention provides an automated separator system for separating containers from paper. The system includes a plurality of spaced rotating discs defining a screen having a length. The screen is adjustable with regard to both an angle of inclination along its length and a rotational speed of the rotating discs. The screen outputs a paper stream including primarily paper and a container stream including primarily containers. The separator system includes a control system which includes a first measuring unit for measuring an amount of containers in said paper stream, and a second measuring unit for measuring an amount of paper in said container stream. The control system further includes a control mechanism for automatically adjusting at least one of the angle of inclination and the rotational speed of the rotating discs in coordination with measurements made by the first and second measuring units.

Accordingly, it is an object of the present invention to provide improved methods of adjusting the operation of an adjustable separator.

Another object of the present invention is to provide methods of automated control of adjustable separators.

Still another object of the present invention is the provision of methods and systems for continuously monitoring and adjusting the operation of a material separator to improve the efficiency of operation of the separator.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

The Overall MRF System

Figure 2:
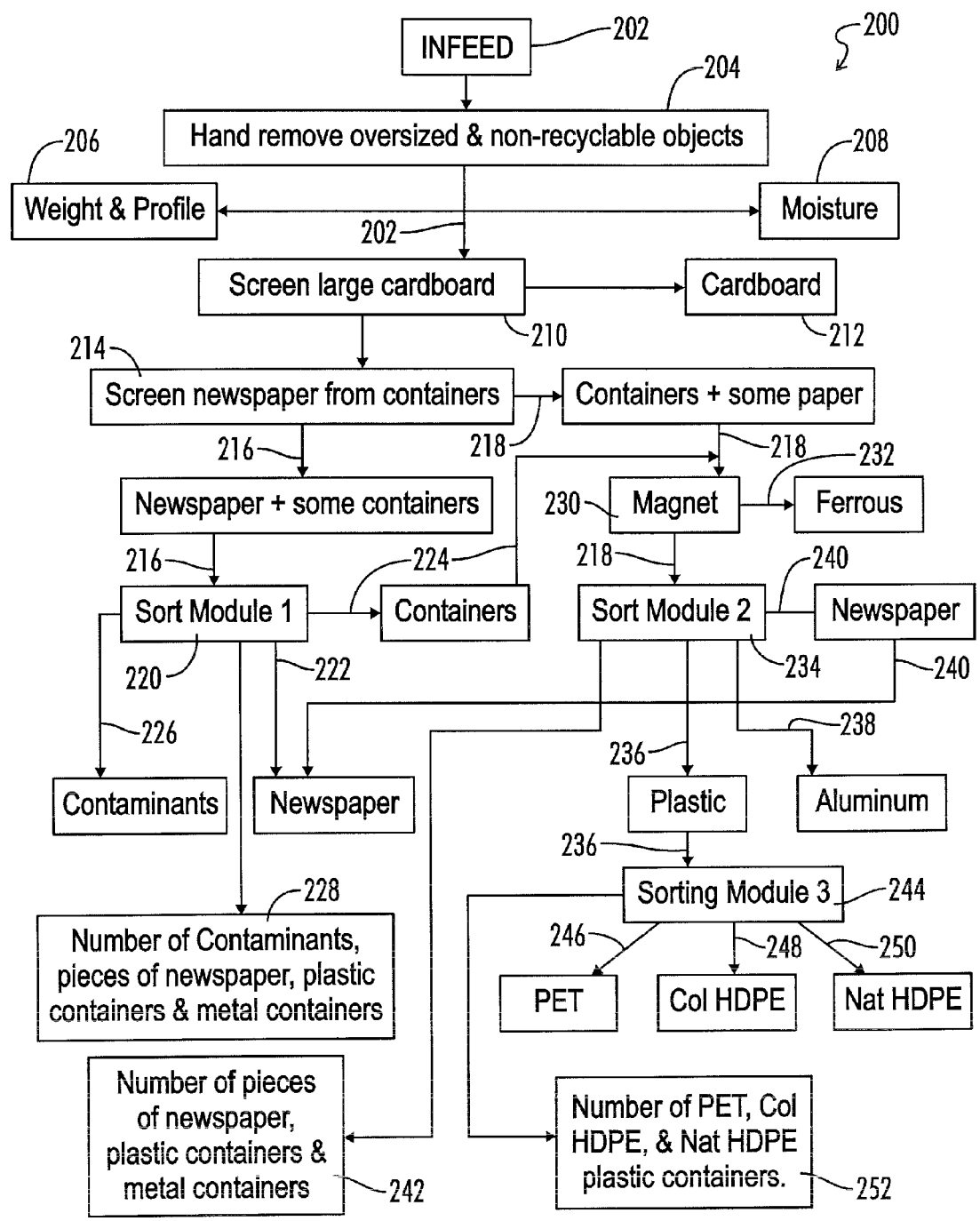
FIG. 2 is a schematic flow chart of the Materials Recovery Facility of the present invention utilizing automated sorting devices, and utilizing sensors and counting technology for automating the control of the sorting devices.

Referring now to FIG. 2, the Materials Recovery Facility (MRF) of the present invention is shown and generally designated by the numeral 200. FIG. 2 schematically illustrates the major components of and the material flow through the Materials Recovery Facility 200.

An input waste material stream 202 enters the MRF 200. As indicated at block 204, oversized and non-recyclable objects are removed by hand.

A weight and profile sensor 206 and a moisture sensor 208 are provided to monitor the weight, the height profile and the moisture content of the input material stream 202.

As indicated at block 210 a large article screening device 210 may be used to separate large cardboard items which go to a cardboard destination 212.

The bulk of the material which is typically made up of containers of various types and newspaper goes to a mechanical screening device 214 which may, for example, be an adjustable angle trough shape screening device such as that further described below with regard to FIGS. 3-6. Alternatively the screening device may include inclined flat bed screens like those described below with regard to FIG. 7 or other suitable screening devices.

The screening device 214 separates the material stream into a first stream or paper stream 216 which includes some containers, and a second stream or container stream 218 which includes some paper.

As further described below, the weight and profile sensors 206 and moisture sensor 208 will be used to provide, among other things, an initial estimation of the composition of the incoming material stream 202 for the initial setting of operating parameters on the adjustable screening device 214.

The paper stream 216 is carried to a first sorting module 220, which may for example be a FiberSort™ module, available from Advanced Sorting Technologies of Nashville, Tenn. The first sorting module 220 separates the paper stream 216 into a newspaper stream 222, a secondary container stream 224 and a contaminant stream 226. The contaminant stream 226 from first separator 220 may include cardboard, six pack carriers, pizza boxes, frozen food boxes and the like.

The first sorting module 220 has associated therewith a first sensing device 228 which counts the number of items of various types flowing into the newspaper stream 222, the secondary container stream 224 and the contaminant stream 226. As is further disclosed below, this counting is preferably done on the basis of area so that what is actually counted is the area occupied by the various streams on a conveyor as they pass through the first sorting module 220. As further described below, the data collected from the first sensing device 228 and other sensing devices to be described below, is utilized with an automated control system (see FIG. 8) to adjust various operating parameters of the automated equipment and to adjust flow rates for various portions of the MRF in order to optimize the operation of the MRF as desired or necessary.

The container stream 218 exiting the separator apparatus 214 passes through a magnetic separator 230 which removes ferrous items into a ferrous metal stream 232. The container stream 218 then flows to a second sorting module 234. The second sorting module 234 may also be a FiberSort™ module from Advanced Sorting Technologies, similar to the first sorting module 220 described above. The second sorting module 234 separates the container stream 218 into a plastic container stream 236, an aluminum container stream 238 and a secondary newspaper stream 240.

The second sorting module 234 has a second sensing device 242 associated therewith which counts the plastic containers, aluminum containers and newspaper sorted by the second sorting module 234. Again, this counting is preferably done on the basis of the area of the conveyor belt or other conveyor mechanism passing through sorting module 234 which is occupied by the various materials.

The supplemental newspaper stream 240 is returned to and joined with the main newspaper stream 222 exiting first sorting module 220. Similarly, the secondary container stream 224 existing first sorting module 220 is returned to the container stream 218 upstream of magnetic separator 230.

The plastic container stream 236 passes to a third sorting module 244. The third sorting module 244 may for example be an Aladdin™ or Sapphire™ sorting module, each available from MSS, Inc., which provide sorting of different types of plastic containers. Sorting module 244 sorts the plastic container stream 236 into a PET (Polyethylene Terephalate) container stream 246, a colored HDPE (High Density Polyethylene) stream 248, and a natural HDPE (High Density Polyethylene) stream 250.

Third sorting module 244 has a third sensing device 252 associated therewith for sensing and counting the number of containers in the PET stream 246, the colored HDPE stream 248, and the natural HDPE stream 250.

The sensor systems used in each of the sorting modules described above such as the Aladdin™, Sapphire™ or FiberSort™ sorting modules available from MSS, Inc., divide the area on the conveyor belt into an array of pixels. Each pixel is scanned by the sensor to determine various measurable characteristics of the material located in that pixel. The data representative of each scanned pixel is then compared to a set of data maps and either matches one of the known data maps or is determined to be an unknown material, or is determined not to be an object at all. For example, the maps may be representative of metal, plastic, paper or other material. Thus each pixel, and accordingly each increment of area on the conveyor belt passing below the sensor, is identified as either being: (1) metal, (2) plastic, (3) paper, or (4) other. Periodically the control system 300 described below with regard to FIG. 8 will query the sensor units and the units will send the count total for the number of pixels falling in each category to the microprocessor 304, and then reset the counts to zero. Alternatively, the unit could calculate a moving average of each count type over some period (such as one minute) and then report those values directly to the microprocessor 304 when asked. The microprocessor 304 will use the four count totals or averages to calculate the percentage of each material in the feedstream and the total feed rate, if desired. This pixel count is representative of the area that each of the identified material types occupies on the conveyor. This information will then be used to optimize the feed system.

The V Shape Rotary Disc Screen

Figure 1:
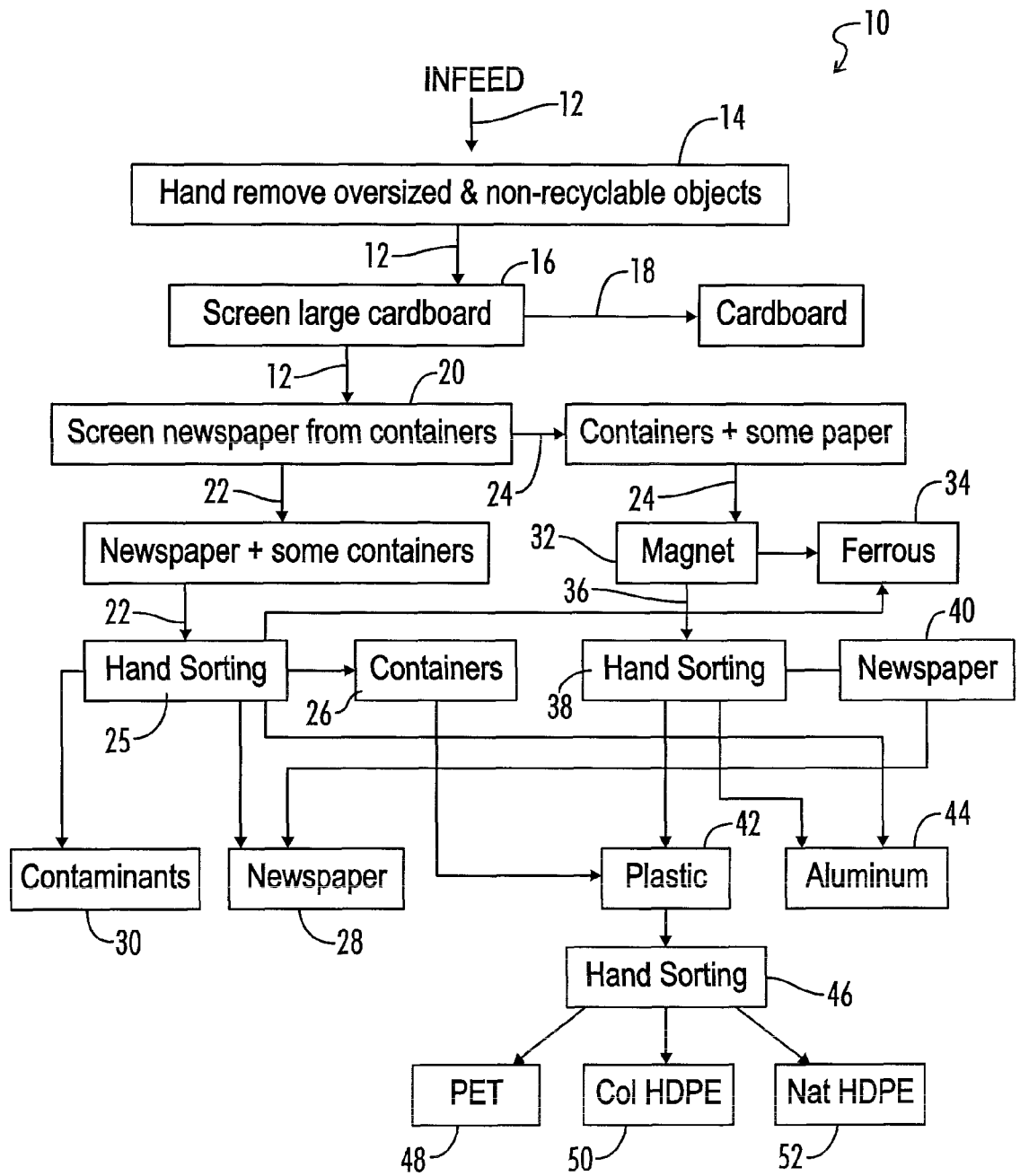
FIG. 1 is a flow chart of a typical prior art Materials Recovery Facility.

One preferred separator apparatus for use as the separator apparatus 214 of FIG. 1 is the adjustable V shape trough type rotary disc screen available from CP Manufacturing previously noted. Such an adjustable screening device is schematically illustrated in FIGS. 3-6 and referred to by the numeral 214A. The V trough style separator apparatus 214A is preferably constructed in accordance with the teachings of U.S. Pat. No. 6,648,145 to Davis et al., the details of which are incorporated herein by reference.

Figure 3:
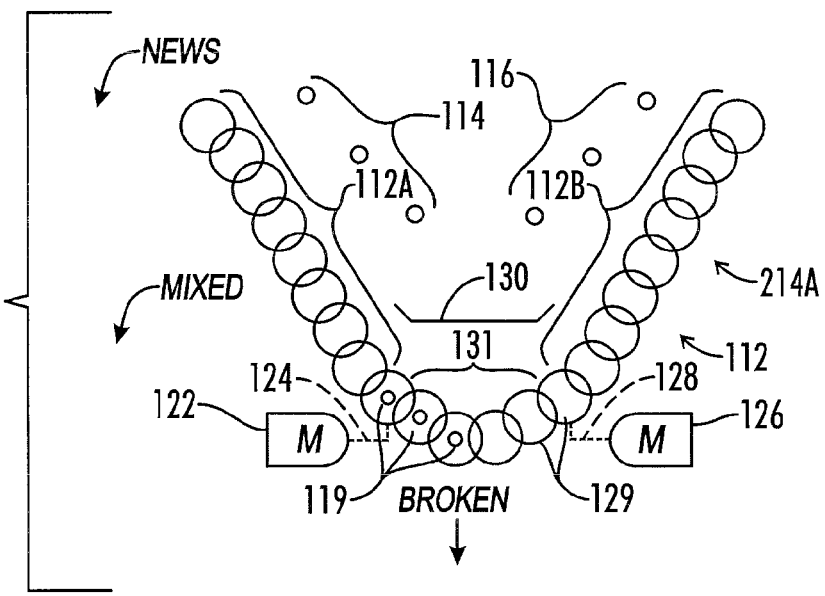
FIG. 3 is a schematic vertical elevation view of a trough shape rotary disc screening apparatus.
Figure 4:
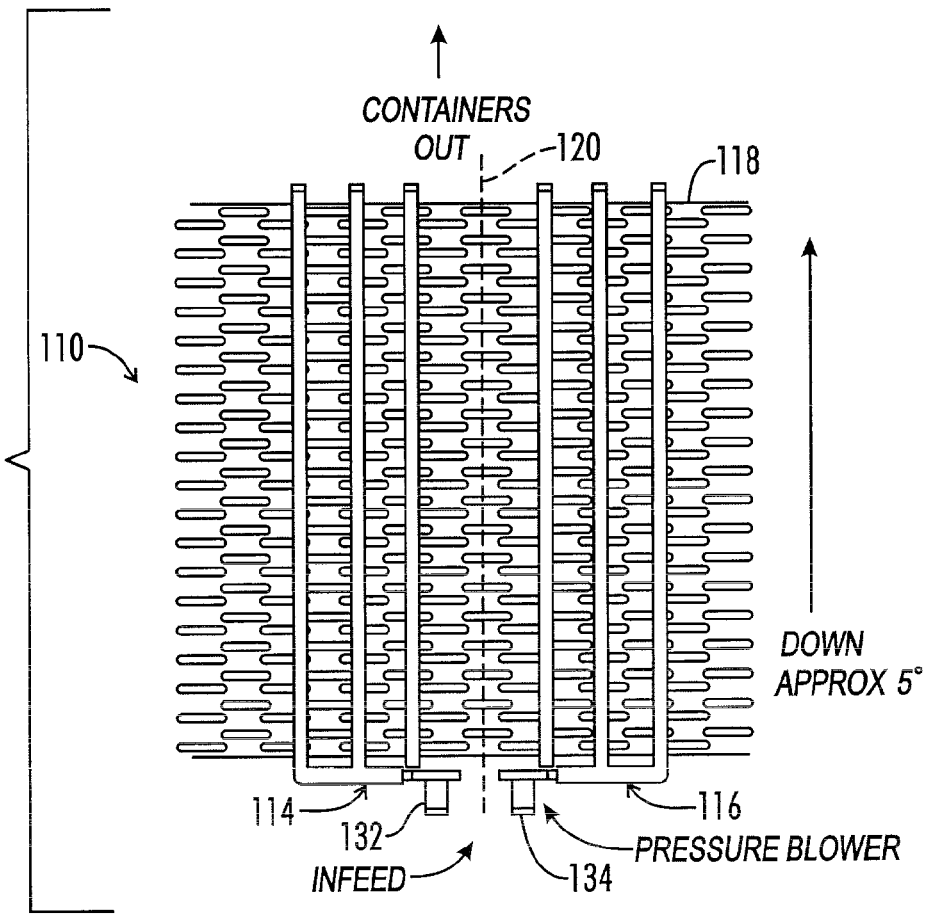
FIG. 4 is a plan view of the apparatus of FIG. 3.

The separator apparatus 214A is in the form of a trough-shaped disc screen 112 equipped with a pair of separator air manifolds 114 and 116. Referring to FIGS. 3 and 4, the recycling apparatus 214A includes a frame 118 that rotatably supports a plurality of laterally extending shafts 119 that spin about laterally extending axes such as 120. The shafts 119 of the trough-shaped disc screen 112 are longitudinally spaced and are located at progressive heights to provide a generally V-shaped configuration as best seen in FIG. 3. The shaft that rotates about the axis 120 (FIG. 4) and the additional shafts to the left of axis 120 are rotated by a motor 122 through a drive linkage 124 in a counter-clockwise direction in FIG. 3. The shafts to the right of the axis 120 (FIG. 4) are rotated by another motor 126 (FIG. 3) via a drive linkage 128 to rotate the discs 129 on these shafts in a clockwise direction in FIG. 3. The drive linkages 124 and 128 preferably each include a plurality of sprockets (not illustrated) which are mounted to the ends of the shafts 119 and a plurality of separate chains (not illustrated) entrained about these sprockets. Sprockets (not illustrated) are also mounted on separate gear reduction assemblies (not illustrated) driven by each of the motors 122 and 126. The shafts 119 could be driven directly or indirectly with gears, belts, chain drives, transmissions, electric motors, hydraulic motors, internal combustion engines, and various combinations of these drive means.

The input stream 12 of mixed recyclable materials is carried by a conveyor 130 (FIG. 3) and deposited onto a lowermost region 131 of the trough-shaped disc screen 112. While the discs 129 are referred to as "discs" they preferably have an irregular outer contour or shape so that when all of the shafts 119 of the recycling apparatus 214A are rotated, mixed recyclable materials deposited thereon will be agitated and moved along in various conveying directions. In accordance with well known techniques, the spacing of the discs 129 and the resulting dimensions of the openings therebetween determines the size of the materials that will fall downwardly between the discs 129.

The shafts of the lowermost region 131 are preferably slightly downwardly angled from the horizontal, at an angle, for example, of about five degrees. The spacing of the discs 129 along the various shafts of the trough-shaped disc screen 112 and the angle of vertical inclination of the two vertically inclined regions 112A and 112B of the disc screen 112, along with the rotational speed of these discs, is adjustable as further described below.

Optimum classification by the recycling apparatus 110 is enhanced by the air manifolds 114 and 116 which are connected to squirrel cage blowers 132 and 134 (FIG. 4). The manifolds 114 and 116 may be formed of segments of plastic or metal pipe with holes bored therein at intervals to form nozzles that eject streams of air toward the discs 129 to press newspaper against the discs and aid in the discs 129 conveying the same upwardly. Preferably the streams of air are inclined to help advance the newspaper upwardly. Each of the air manifolds 114 and 116 includes a plurality of laterally extending and longitudinally spaced conduits each having a plurality of laterally spaced nozzles. The conduits are coupled to a longitudinally extending header, the headers being connected to respective ones of the blowers 132 and 134. These conduits are positioned sufficiently close to the first and second vertically inclined regions 112A and 112B so that containers that are partially conveyed upwardly along the first and second vertically inclined regions 112A and 112B can tumble over the first and second air manifolds 114 and 116. Other sources of pressurized air besides the squirrel cage blowers 132 and 134 may be utilized, such as fans, pumps, pressurized tanks, and so forth.

The lateral spacing between the discs 129 of the lowermost region 131 is less than the lateral spacing between the discs 129 of the vertically inclined regions 112A and 112B. Broken glass falls downwardly between the discs 129 of the lowermost region 131 of the trough-shaped disc screen 112. Mixed recyclable materials fall through the discs 129 located along the intermediate portions of the vertically inclined regions 112A and 112B. Newspaper is conveyed upwardly over the output ends at the upper terminal ends of the vertically inclined regions 112A and 112B to the newspaper stream 222. Large articles such as plastic milk bottles and soda pop containers tumble down the vertically inclined regions 112A and 112B of the V-shaped disc screen 112 and eventually fall off of the side of the recycling apparatus 214A to the container stream 224. Preferably the axes of the shafts 119 of the inclined region 112A all extend in a first common plane and the axes of the shafts of the inclined region 112B all extend in a second common plane.

Thus a stream of mixed recyclable materials is conveyed onto one side of the V-shaped disc screen 112 by the conveyor 130 at the end marked "INFEED" in FIG. 4 and large articles are conveyed out of the other side of the V-shaped disc screen 112 at the side marked "CONTAINERS OUT" in FIG. 4.

Figure 5:
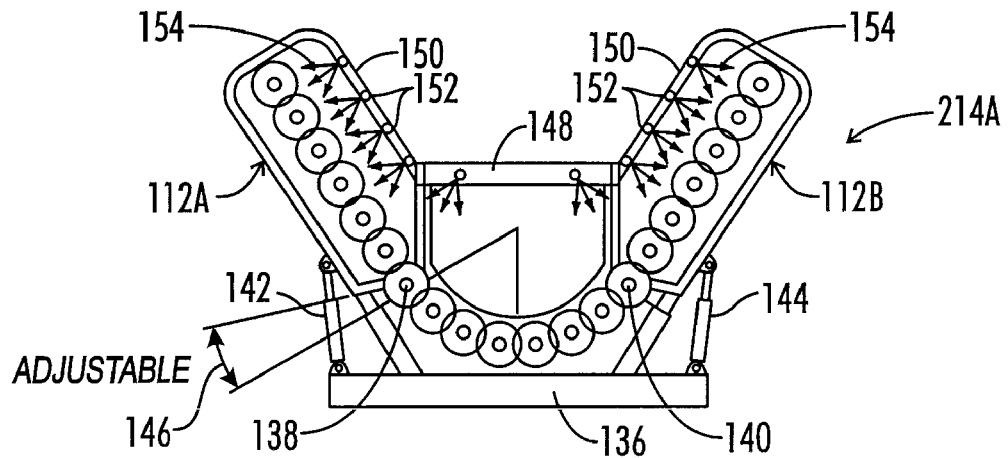
FIG. 5 is a view similar to FIG. 3 illustrating the mechanism for adjusting the V angle of the separator of FIGS. 3 and 4.

FIG. 5 is a view similar to FIG. 3 but illustrating the structure and manner of adjustment of the V angle of the separator apparatus 214A of FIG. 3. The inclined portions 112A and 112B are pivotally mounted to a base frame portion 136 via pivot assemblies 138 and 140. The pivot assemblies 138 and 140 comprise selected ones of the shafts 119 that support the discs 129. Lifting devices in the form of hydraulic cylinders 142 and 144 are provided for independently varying the angle of inclination 146 of the inclined sections 112A and 112B to adjust and optimize the separation of mixed recyclable materials. The lifting devices 142 and 144 can be any other conventional lifting devices such as motorized jack screws, pneumatic lifters, and equivalent mechanical mechanisms used in heavy machinery to lift and move large frame members.

The articulating V shape disc screen apparatus 214A of FIG. 5 also incorporates internal air ducting 148 and 150 which feeds air manifolds 152 to provide air jets 154 blowing onto the face of the inclined screen portions 112A and 112B to aid in holding newspaper against the inclined portions.

Figure 6:
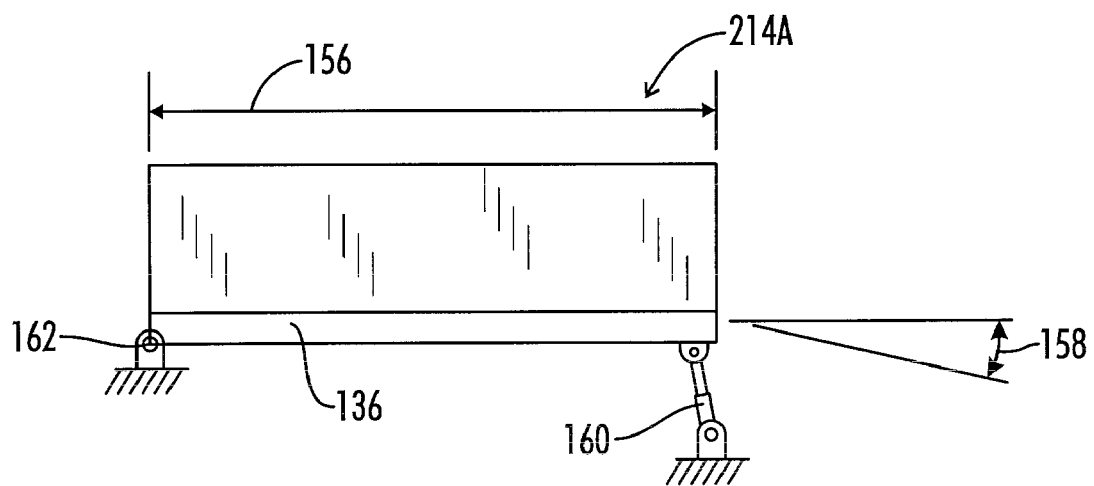
FIG. 6 is a schematic side elevation view of the apparatus of FIGS. 3-5 showing the manner of adjustment of the inclination along the length of the trough.

As schematically illustrated in the side elevation view of FIG. 6, the base frame 136 of the separator apparatus 214A is also inclined along its length 156, which is generally parallel to the axis 120 of FIG. 4. An angle of inclination 158 along the length 156 is adjustable by a lifting means 160 which pivots the frame 136 about a pivot point 162. The lifting means 160 may be a hydraulic cylinder or any of the other suitable lifting means described above with regard to lifting means 142 and 144.

Inclined Flat Bed Screens

Figure 7:
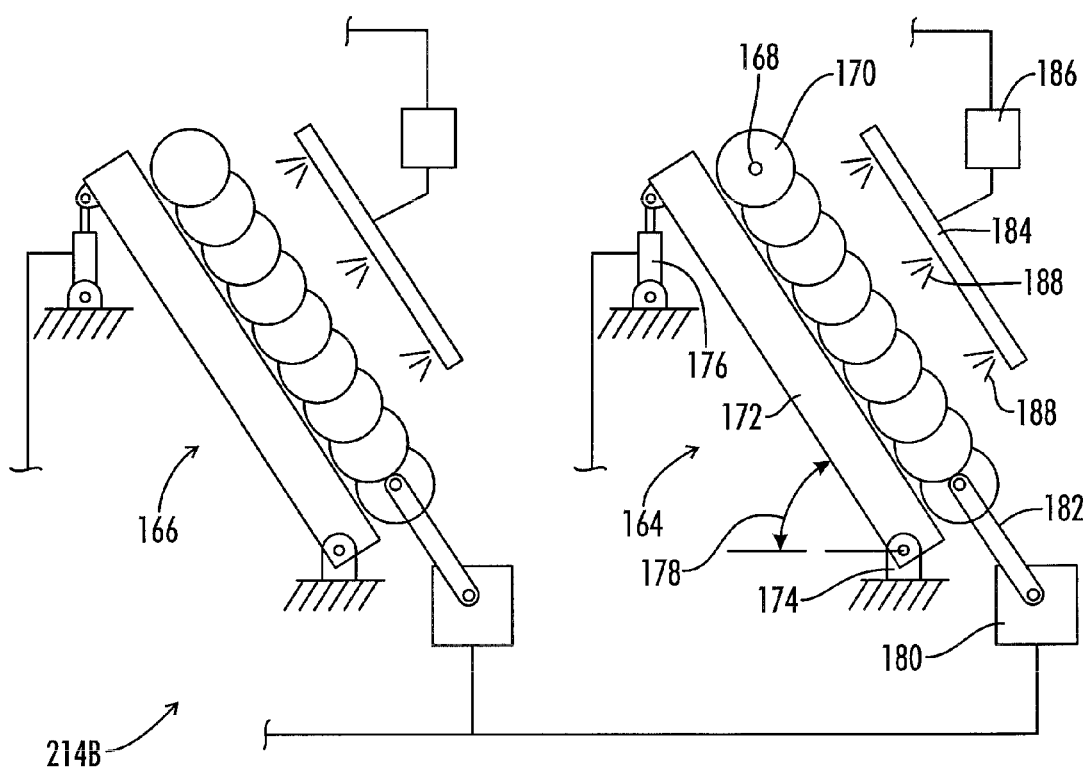
FIG. 7 is a schematic side elevation view of an alternative separator system including two inclined flat bed rotary disc screening devices.

Referring now to FIG. 7, an alternative separator apparatus 214B includes a pair of inclined flat bed screens 164 and 166. The flat bed screens 164 and 166 may, for example, be constructed in accordance with the teachings of U.S. Pat. No. 6,250,472 to Grubbs et al. with reference to FIGS. 8 and 9 thereof, the details of which are incorporated herein by reference. The inclined flat bed screens 164 and 166 may also be constructed in accordance with the teachings of U.S. Pat. No. 6,460,706 to Davis, with reference to FIGS. 1-3 thereof, the details of which are incorporated herein by reference.

Each of the flat bed screens such as screen 164 includes a plurality of shafts such as 168 seen in end view in FIG. 7, having discs such as 170 rotatable with the shaft 168. The shafts 168 are mounted upon a frame 172 which is pivotable about a pivot point 174 due to lifting mechanism 176 to adjust an angle of inclination 178. The shafts 168 and disc 170 are rotated by a motor 180 which drives the shafts through chain 182 or other suitable linkage.

An air manifold 184 has air provided from air supply 186 so that jets 188 are directed onto the face of the flat bed screen 164.

The second flatbed screen 166 is similarly constructed.

Controls Based Upon Monitoring Characteristics of Input Stream

One approach to determining the composition of the feedstream 12 is to measure the weight and depth profile of the material on the conveyor that feeds the screen with sensor 206. The density of the feed material can then be computed from the weight and depth profile and an estimate made of the composition of the material entering the screens 210 and 214. An approximate correlation between the density of the feedstream and its composition can be determined by taking samples of the feedstream over time and analyzing their composition as compared to the measured density.

This approach can provide a first approximation to optimizing the screen operating parameters in real time. Detailed observation of the operation of the screen and experimentation with the operating parameters with feed material of differing densities would be used to develop a table of optimum operating parameters for the different feed material densities. Then as the feed material density changes the operating parameters of the screen would be automatically changed via variable frequency drives for the shaft motors and hydraulic or actuator controls for the screen angle.

The above method while approximate would still provide an improvement over current operating practices wherein the screen parameters are only occasionally adjusted manually using only the operator's estimate of the feed material composition.

Using the information from the weight and profile sensors 206 on the infeed belt an approximate correlation can be made between the density of the infeed and the optimum screen parameter settings. This information can also be used to determine the approximate optimum screen parameters and shorten the time for the optimization program to find the actual optimum settings.

The moisture content of the feedstream strongly effects the operation of the screens. The moisture is primarily contained in the paper, and alters the infrared signature of the paper depending upon the amount of moisture in the paper; the amount of moisture can be measured in this way. Also devices are available for measuring the moisture content of the air in proximity to the paper. By adding a moisture sensor 208 to the system, a further data point is available for "presetting" the screen parameters based on the "setup" data collection process.

Adjustment Based Upon Measuring the Effectiveness of the Separation

Another more accurate approach to the above problem is also possible now. In the past few years automated sorting devices such as sorting modules 220, 234 and 244 have become available for MRFs. This equipment uses near infrared spectrometer technology to identify and separate plastic bottles by resin type and to distinguish fiber (paper) objects from plastic. Other equipment is available which uses eddy current technology to identify metal type (e.g. ferrous versus nonferrous such as aluminum).

By incorporating additional software into these systems, the sorting modules can also be used to count the number of plastic, metal and paper objects that pass through them as indicated at 228, 242 and 252 in FIG. 2. What is proposed then is a system wherein data are taken from at least two sorting modules and used to optimize the screen operating parameters.

One sorting module 220 would receive the paper output stream 216 from the screen 214 while the other sorting module 234 would receive the container output stream 218 from the screen 214. The first sorting module 220 would reclaim the containers lost to the paper stream while at the same time counting the number of containers and paper objects via sensor 228. The second sorting module 234 would reclaim the paper lost to the container stream 218 while also counting, via sensor 242, the number of paper objects reclaimed and the number of containers passing through the sensor 242.

This information can then be used to optimize the screen parameters with the following as an example. Other approaches to implementing the software algorithm can also be implemented. It should also be understood that it is relatively straightforward to determine the practical operating range of the screen parameters by visual observation of the operation of the screen 214. For example the angle between the sides 112A and 112B on the V screen typically ranges from about 35 to 50 degrees, the tilt angle 158 of the V typically ranges from about 5 to 12 degrees, and the rotor motor variable frequency drive frequency typically ranges from about 40 to 70 Hertz.

Data from sorting modules 220 and 234 would be recorded for some period of time (from say 1 minute to 5 or 10 minutes). Then the number of paper and plastic objects counted by each module would be averaged over that period of time. Then either the screen angle or rotor speed or tilt angle would be changed by a few percent (say 5 percent of the total range of change available). Then the data from the two sorting modules would be averaged over a same period of time and the results compared with the previous result.

If the comparison shows an improvement (reduced total paper in the containers and containers in the paper) then the parameter would be changed by a few percent further in the same direction (increased or decreased). This process would be continued until a decrease in screen performance was found.

If the parameter change produces a decrease in screen performance then the change would be reversed and a few percent change made in the parameter in the opposite direction. If no change in performance is measured after the parameter change, then the selected parameter would be sequentially changed in addition incremental percents until a change is measured.

The actual software process would be equivalent to making a series of operation measurements for different settings of the selected parameter, plotting the operational efficiency again the parameter setting and then finding the maximum of the operation efficiency.

When the optimum setting has been determined for the selected parameter, the next parameter (e.g. rotor speed) would be changed as above while operating measurements are made. After all the operating parameter maximums are determined, the process is started over again. A body of operational data will then be collected such that each of the operating parameters maximums are found with different values of the other parameter settings. That is, it may be that parameter 1 could have a different maximum operating setting when parameter 2 is set differently than when the maximum for parameter 1 was determined for the first parameter 2 setting.

The data collected above can then be stored in 3 dimensional look up tables (tilt angle axis, rotor speed, and V angle) or as concentrations of optimum points in a 3 dimensional graph for each range of feed material composition. The composition data would be derived from the outputs of the sensor modules.

The above can be considered to be the data collection phase of the optimization system. It is anticipated that for each new installation of a screen as part of an overall sorting system (or a retrofit) that the data collection phase would be implemented for sufficient time to cover the feed material collected from all the different locations. It is well known that recyclables from different neighborhoods are often of differing composition of paper versus containers, glass versus aluminum, etc.

These graphs or lookup tables would then be used to determine the best starting point setting for the screen parameters for day to day implementation of the optimization program. The actual running of the program would proceed as above with continual varying of the operating parameters while continually measuring the paper contamination in the plastic and the plastic contamination in the paper.

A further goal of the program is to refine the starting parameters based on the measured composition of the feedstream. The closer the initial setting of the screen parameters are to optimum the less time it will take to reach optimization for that particular composition. Thus, the more data available on the composition the more refined the starting parameters can be.

Newly available eddy current sorting modules for aluminum cans utilize an array of eddy current detectors spanning a sorting belt. As aluminum or steel cans cross the array their presence is detected and with appropriate timing an air jet array ejects the aluminum can away from other cans, paper or plastic containers. The array can additionally be used to count the number of aluminum (and separately steel cans) which pass through the module. This newly available eddy current separator can thus be used to provide additional composition data for the optimization program.

Recently the eddy current array has been added to the near infrared plastic sensor array to allow reclamation of aluminum cans from the screen's paper stream in addition to the reclamation of plastic bottles. This allows counting of all the aluminum cans in the feedstream (those in the container stream as well as those lost to the paper stream). Further the plastic bottle stream typically needs to be separated into the three standard types, PET (drink bottles), colored HDPE (detergent bottles) and natural HDPE (milk bottles).

This separation is accomplished with the third separator module 244. Thus, further information on the composition of the feedstream is now available as these modules can also count the number of each type of plastic bottle (as well as the color).

Two components of the recyclable stream that at this time cannot be directly measured are the glass bottles and the steel cans. If we, however, combine the data from the three separation modules such that the number and therefore the approximate weight of the paper, aluminum, and plastic in the feedstream is known, then the majority of the remaining weight is glass and ferrous metal. Since the ferrous metal is typically baled and sold on a daily basis, the approximate weight of the glass can then be calculated.

The Automated Control System

Figure 8:
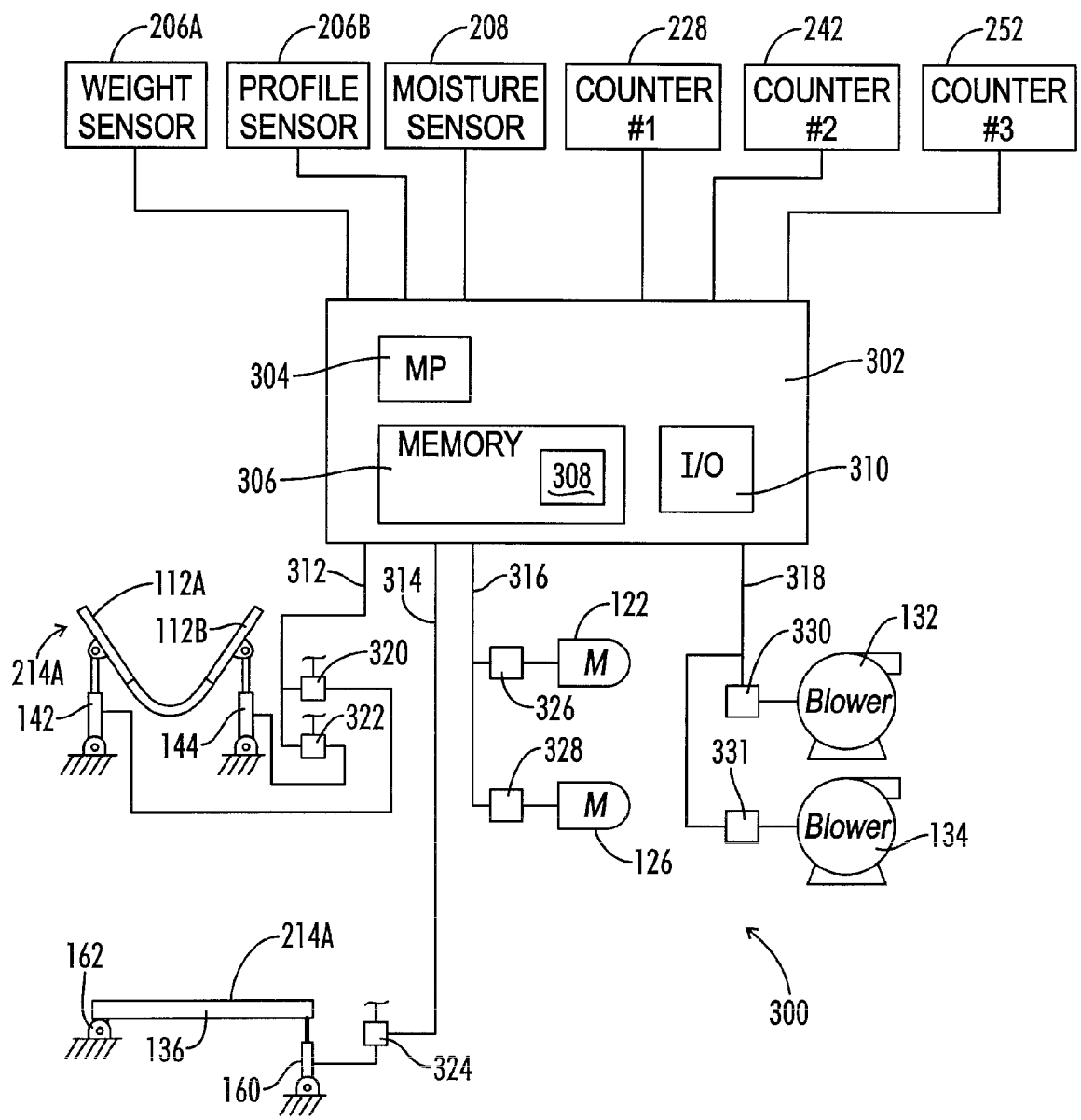
FIG. 8 is a schematic illustration of the computerized control system.
Figure 9:
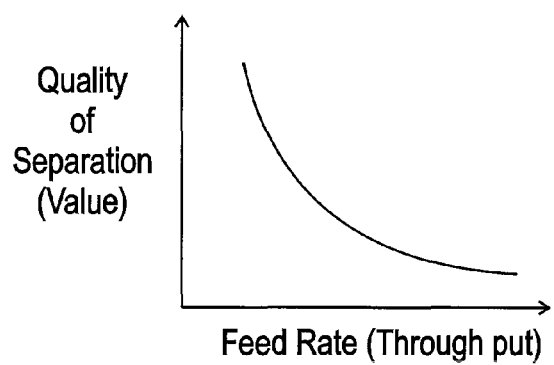
FIG. 9 is a graphical representation of separating efficiency versus throughput or feed rate for a mechanical or automated separator.

The control system of FIG. 8 is generally designated by the numeral 300. The control system 300 includes a microprocessor based controller 302 which includes microprocessor 304, memory 306, a software portion 308, and an input-output device 310.

The system 300 also includes the various sensors and actuators previously described and schematically illustrated in FIG. 8, along with various communication lines (or wireless systems) connecting the sensors to the controller 302, and the various actuators for the mechanical separators along with control devices for those actuators which are capable of converting an electronic control signal from controller 302 into a physical action of the actuator.

The sensors include weight sensor 206A and profile sensor 206B which comprise the weight and profile sensor 206 of FIG. 2. Also included is the moisture sensor 208 of FIG. 2, and the counting devices 228, 242 and 252 associated with the first, second and third sorting modules, respectively.

The actuators include the first and second lifting mechanisms 142 and 144 for controlling the V angle of the V shape separator 214A. Also included is the lifting mechanism 160 for controlling the bed tilt angle of the separator 214A. Also included are the motors 122 and 126 which control the rotor speeds for the separator 214A. Also included are the blowers 132 and 134 for controlling the air pressure directed to the air jets blowing on the faces of the separator apparatus 214A.

The microprocessor 304, in response to input signals from the various sensors, and in accordance with the programming contained in software 308, and instructions received from an operator via input-output device 310, sends various control signals via control signal lines 312, 314, 316 and 318.

Control signals over line 312 go to control devices 320 and 322 associated with lifting mechanisms 142 and 144, respectively.

A control signal communicated over control line 314 to control device 324 controls the flow of hydraulic fluid to lifting mechanism 160.

Control signals are carried over control line 316 to control devices 326 and 328 to control the speed of motors 122 and 126.

Control signals over control line 328 are carried to control devices 330 and 331 for controlling the speed of blowers 132 and 134 which provides pressurized air to the air jets.

As will be appreciated by those skilled in the art many other types of sensors could be used to sense various parameters of the input stream and of the various product streams, and various actuators can be utilized to control the various operating parameters of the separating devices.

Methods of Sorting Recycled Materials with Automatically Adjustable Separator Using Downstream Feedback One method of operation of the Materials Recycling Facility 200 can be described as a method of sorting recycled materials which begins with providing the input stream 202 of recycled materials, wherein a composition of the input stream 202 is subject to variation during a time interval. This is very common for any typical materials recycling facility where the makeup of the recycled materials and other input parameters such as moisture content can vary rapidly throughout the day.

That input stream 202 is moved through a separator machine such as separator apparatus 214A of FIGS. 3-6 or 214B of FIG. 7, which separating machine has a plurality of adjustable machine operating parameters.

For the V shape separator device 214A of FIGS. 3-6, the adjustable parameters include the angle of the V between the sides 112A and 112B, the tilt angle 158 of the frame parallel to its central axis 120, the speed of the rotors as determined by the speed of motors 122 and 126, and the flow of air to the air jets from air manifolds 114 and 116.

For the inclined flat bed separators such as separator 214B of FIG. 7, the adjustable parameters include tilt angle 178, the rotor speed as determined by the speed of motor 180, and the air flow to air jets 188 directed against the face of the separator screen.

Typically a feedback control loop for any type of control system will simply monitor a downstream parameter and compare that to some preset target and then adjust the upstream adjustment in order to achieve the predetermined target. Such a feedback system could be utilized in some cases with the present invention, but the preferred control system instead takes each of the adjustable machine operator parameters in turn and via the control system 302 adjusts a first one of those adjustable machine operating parameters while monitoring with the computerized control system a quality of separation achieved by the separator machine, so as to select a value of the first parameter that improves the effect of the first parameter on the monitored quality of separation.

After the first adjustable parameter has been optimized, the controller 302 will begin adjusting a second one of the adjustable machine operating parameters while monitoring the quality of separation achieved by the separator machine, so as to select a value of the second parameter that improves the effect of the second parameter on the monitored quality of separation. This can be continued until the second adjustable machine operating parameter has been optimized. This is continued with each of the adjustable machine operating parameters for the separator machine in question, and then the process is repeated, returning to the first of the adjustable machine operating parameters and adjusting it to see if further optimization can be achieved.

In this manner, there is a continuous ongoing process of sequential adjustment of each adjustable machine operating parameter while observing the effect of that adjustment on the quality of separation, so that in effect a continuous adjustment of the separator machine is provided throughout its period of operation thus accommodating changes in the input stream very quickly.

When utilizing counting devices such as counters 228, 242 and 252 as the means of sensing the effect on the downstream product, very precise measures of the effect of the change in one of the machine operating parameters can be achieved.

More particularly, this method of adjustment can be described as a method of sorting an input waste material stream 202 including a mixture of first and second material such as paper and containers. That input waste material stream 202 passes through the adjustable separator 214 and is separated into a first output stream 216 which in this case is a paper stream containing the majority of the paper and some contaminant containers, and a second output stream 218, which in this case is the container stream 218, containing the majority of the containers and some contaminant paper.

The counting devices 228, 242 and 252 can very accurately count the amount of contaminant containers in the supplemental container stream 224 which is extracted from the paper stream 216, and the amount of contaminating paper in the supplemental paper stream 240 which is extracted from the container stream 218.

Then, when one of the adjustable machine operating parameters of separator 214 is adjusted, the amount of contaminant containers in supplemental container stream 224 and the amount of contaminant paper in supplemental paper stream 240 are observed, and a signal is generated indicative of whether the combined amount of contaminant material has decreased. If the total amount of contaminant material contained in streams 224 and 240 has decreased, then that first adjustable parameter is further adjusted in the same direction which is the direction indicated as being favorable to decreasing the combined amount of contaminant material. If, however, the first adjustment resulted in an increase in the total amount of contaminant material in streams 224 and 240, then the next adjustment of the first adjustable parameter would be in the opposite direction. The first adjustable parameter of separator machine 214 is continuously adjusted in this manner until there is no further improvement or reduction in the total amount of contaminants.

The first counter 228 may also be referred to as a first detector 228 for detecting an amount of container contaminants in the paper stream 216. The second counter 242 may be referred to as a second detector for detecting an amount of paper contaminants in the container stream 218.

It will be appreciated that the controller 302 may be readily programmed to either equally weight the contaminants in each of the paper stream and container stream, or to favor a reduction in contaminants in one stream at the expense of an increase in contaminants in the other stream.

As previously noted, the sorting modules 220, 234 and 244 may be selected from a number of available models which can be obtained from MSS, Inc., the assignee of the present invention, including for example the FiberSort™ model, the Aladdin™ model and the Sapphire™ model. These separators can use various types of sensor systems, but in general these systems utilize sensors which are capable of sensing the identification of each item in the product stream via reflection of light from the item. Light energy of a selected type is projected onto the conveyor belt and optical sensors detect reflected light thus enabling the sensor to identify the type of material at each location on a conveyor belt flowing past the sensor.

Typical examples of such optical sensing technology are found for example in the following U.S. patents and applications which are assigned to the assignee of the present invention or its subsidiary AST, Inc., and the details of which are incorporated herein by reference: U.S. Pat. No. 6,570,653; U.S. Pat. No. 6,778,276; U.S. Pat. No. 6,369,882; U.S. patent application Ser. No. 09/516,257, entitled "Multi-Grade Object Sorting System and Method", filed Feb. 29, 2000; U.S. patent application Ser. No. 10/921,000, filed Aug. 18, 2004 for "Sorting System Using Narrow-Band Electromagnetic Radiation"; U.S. Pat. No. 5,318,172; U.S. Pat. No. 5,460,271; U.S. Pat. No. 5,917,585; U.S. Pat. No. 5,966,217; U.S. Pat. No. 6,137,074; U.S. Pat. No. 6,144,004; U.S. Pat. No. 6,504,124; and U.S. Pat. No. 6,497,324.

The chosen sensor technology, as previously noted, is preferably utilized to measure the presence of the various material types on an area basis.

Methods of Sorting Recycled Materials with Automatically Adjustable Separators Using Upstream Feedback In another aspect of the present invention a method is provided for separating the input waste material stream 202. In this method, at least one characteristic of the input waste material stream correlating to a density of the waste material stream is measured. Preferably both weight and a height profile of the input waste material stream are measured. The weight can be measured by sensor 206A through any suitable device for weighing the incoming material on a portion of an incoming conveyor belt. The profile sensing device 206B can be a light beam or the like across the conveyor at various height intervals so as to determine the height of the incoming stream of waste material. Since the width of the stream on a conveyor belt is relatively constant, by knowing the weight and height the density of the incoming waste material stream can be approximated.

Based upon that sensed density, an initial value is selected for one or more of the adjustable parameters of separator device 214. This initial value is preferably determined based upon comparison of the sensed density to a historical database of controller 302 which correlates to the particular input stream.

Thus by sensing characteristics of the incoming material stream and comparing the same to a historical database, an initial setting for one or more of the various adjustable parameters of the separator machine 214 can be selected so as to quickly place the separator machine 214 in a condition relatively close to its optimum operating condition.

Then, the separator machine 214 can be run through the process of individually adjusting each of its adjustable parameters and monitoring the downstream effect of that adjustment on the outgoing product streams to further optimize the individual machine.

The initial setting of the separator machine can also be based upon measurements of moisture content in the incoming stream as sensed by moisture sensor 208.

The historical database is built by taking a plurality of samples of a sample waste material stream and determining both the density and composition of each sample, to compile the database of density versus composition. Thus the initial estimation of the composition of the input waste material stream is based upon the measured incoming density, as compared to the historical database.

The controller 302 can collect this data over a period of time and correlate the content of the various product streams to the measured parameters such as density and moisture content of the input stream, and to the optimum settings for the various adjustable parameters of the separator machine 214 so as to further build the historical database and provide a basis for rapid selection of the optimum settings for the adjustable operating parameters of the separator device.

Methods of Optimization of the Overall Materials Recovery Facility

MRFs are designed to handle a "typical" composition of recyclables such that each sorting step is optimally loaded but not overloaded. In overloaded operation, whether it be automated, mechanical or a manual sorting process, removal efficiency suffers as does product purity. Also MRFs typically must process all the material that is delivered each day.

Therefore, as the composition of the feedstream changes it is likely that either one or more of the separation unit operations is being overloaded or that the system is being run at less than its optimum capacity, or that it is not being run at its optimum shift length.

What is needed is a system that optimizes the system operation in terms of the three above considerations. The addition of sensor modules to the MRF can provide real time feedback as to the number of objects going through the various unit operations of the system. Comparing the known capacity of each unit operation with the actual throughput of that operation allows the efficiency of that operation to be determined.

All typical MRFs weigh the incoming recyclables, and many receive all their material before noon. Knowing the amount of material needing to be processed and the capacity of the system allows the approximate processing time to be calculated. A relatively straightforward program can then be implemented which takes the data in real time from the unit operations and knowing the dollar value of each component and the approximate feedrate versus efficiency curves for each unit operation can calculate the optimum processing rate. Conversely if the operating time is fixed, the program can calculate the loss in revenue due to lower product purity or the number of manual sorters that would need to be added to the system to maintain optimum purity.

The ultimate optimization of the Materials Recovery Facility includes an overall assessment of each of the separator devices while taking into consideration other factors such as the economic value of various ones of the output material streams, the cost of operating the various machinery, the cost of manual labor which may be necessary to supplement the automated machinery in certain situations, and various time constraints such as the number of hours the Materials Recovery Facility can be operated each day, and of course taking into account the total volume of material which must be recycled and separated during the operating day for the facility.

Optimizing the profitability of the Materials Recovery Facility depends upon operating the mechanical equipment at the best capacity versus efficiency while minimizing the cost of manual operations, all the while producing the highest possible saleable material quality.

In general, the lower the feed rate to mechanical and automated sorting equipment the higher the quality of the saleable output material (i.e. glass, ferrous material, aluminum, plastic, cardboard, and paper). It is possible to measure the general sorting parameters of both mechanical and automated sorters with regard to sorting efficiency versus throughput. The specific operating parameters will depend upon other factors such as moisture content and percentage composition, but these are second order effects as compared to throughput. Data representative of the feed rate versus separating efficiency relationship for an automatic separator apparatus will typically take the form of a curve generally like that of FIG. 9.

In general, but with less connection, the higher quality saleable output materials will command a higher selling price. However, due to market conditions it is often the case that higher quality does not bring a higher selling price. Further, prices for saleable materials such as glass, paper, aluminum, cardboard and steel are readily available on a day-to-day basis.

Figure 10:
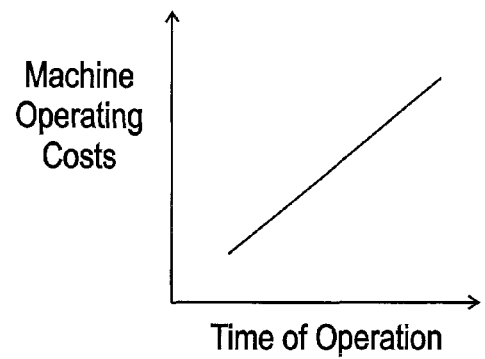
FIG. 10 is a graphical representation of the operating cost of mechanical equipment as a function of time of operation.

The operating costs of mechanical and automated sorting equipment are largely proportional to the length of time the equipment is operated, rather than on the total amount of material processed. The amount of material processed does contribute to wear on the equipment, but the dominant cost factors are electrical usage and wear due to running, whether material is being processed or not. Disc screens are somewhat of an exception to this as material flow over the screen causes significant wear to the discs which must be periodically replaced. Cost for electrical power and spare parts costs are also readily available on a day-to-day basis and may be entered into the system. Data representative of the operating costs of mechanical equipment will typically take the form of a curve like that set forth in FIG. 10.

Figure 11:
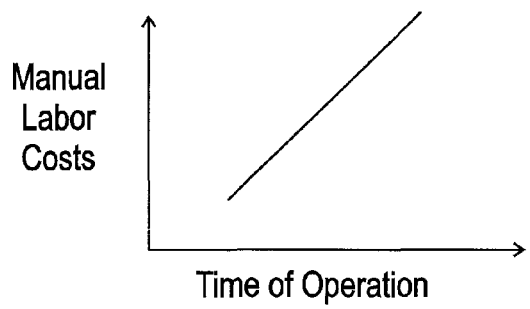
FIG. 11 is a first graphical representation of manual labor costs versus time of operation where labor is available on an hourly basis.
Figure 12:
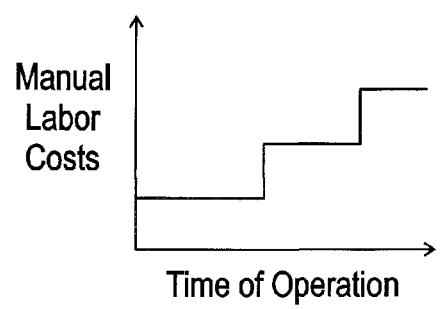
FIG. 12 is a graphical representation of manual labor costs versus time of operation when labor is only available in larger increments due to shift work requirements.

Materials Recovery Facility operating costs due to manual labor are proportional to the length of time the Materials Recovery Facility is in operation regardless of the amount of material being processed. Manual sorters cannot be sent home and then called back in a matter of a few hours. It is also well known from experience how much material a human sorter can on average process per hour. Again, labor costs are also well known on a day-to-day basis and can be input into the system. Data representative of the cost of manual labor will typically take the form of a curve like that of FIG. 11 or 12. FIG. 11 is representative of manual labor costs which are directly variable according to the time of labor required. FIG. 12 is representative of the situation in which labor can only be obtained in increments such as the length of a minimum shift for a worker of four hours, eight hours or the like.

The present invention utilizes a computer program in the software portion 308 into which daily material prices can be entered along with current manual sorting hourly costs, the amount of material that needs to be processed that day, and in which the program can compute the optimum processing time and/or personnel for the day's material to generate the maximum possible net revenue. The program has operating characteristics available, such as in lookup tables or in graph form, for feed rate versus separation quality, manual sorting capacity, wear characteristics of the various mechanical components and the like, as well as the material pricing data noted above.

One such method of optimization can be described as a method of controlling a Materials Recovery Facility. An automatic separator apparatus is used for separating the input material stream into at least a first output stream 216 and a second output stream 218 containing predominantly first and second materials, in this case paper and containers, respectively. Data representative of a feed rate versus separating efficiency relationship for the automatic separator apparatus 214 is provided to the automatic control system 300. It will be appreciated that the faster the separator device 214 is operated, the less efficient it will typically be and the more contaminants will be contained in each of the streams 216 and 218. On the other hand, if the separator 214 is operated too slowly it may not be possible to process all of the material that may be processed within the allotted time. The automatic control system 300 can calculate an optimum processing rate to maximize the profitability of the separation process. The control system can then adjust the feed rate of the input material stream to the automatic separator apparatus so that said feed rate approximates the optimum processing rate.

The control system can provide such a calculated optimum processing rate for the separator 214 and for the various sorting modules 220, 234 and 244, each of which will have a feed rate versus separating efficiency relationship.

The control system will further take into account costs that are representative of a cost of operating the Materials Recovery Facility. That cost data can include data representative of a cost of manual labor for supplemental manual sorting to sort contaminants from one or more of the various output streams. That cost data can further include consideration of an increased cost of manual labor for supplemental manual sorting needed as a result of increased feed rate to one or more of the separators.

The software portion 308 of controller 302 includes a data input software portion for receiving data representative of such an economic value of a product of at least one of the product streams. The data input software portion can also receive inputs of current costs of operation of various portions of the Materials Recovery Facility along with the current cost of manual labor for supplemental manual separation.

It will be appreciated that the historical database can also include data representative of the amount of supplemental manual labor that may be necessary, for example when one or more portions of the Materials Recovery Facility are operated at such a high feed rate that totally efficient separation cannot be achieved and thus manual supplementation may be required. The data input software portion of the automatic control system is also adapted to receive input of total throughput requirement for the facility for a given time interval and a constraint for processing the total throughput requirement through the facility.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

The invention claimed is:

1. A separator system, comprising:
   a separator for separating a stream of recyclable paper and containers into a paper stream including primarily paper and a container stream including primarily containers, said separator having at least one adjustable operating parameter;
   a first detector for detecting an amount of container contaminants in said paper stream;
   a second detector for detecting an amount of paper contaminants in said container stream; and
   a control system operably connected to the separator and the first and second detectors for adjusting the adjustable operating parameter so as to reduce a combined measure of contaminants in the paper stream and the container stream.

2. The system of claim 1, wherein the combined measure of contaminants equally weights the contaminants in each of the paper stream and the container stream so as to minimize total contaminants.

3. The system of claim 1, wherein the combined measure of contaminants favors a reduction in contaminants of one stream at the expense of an increase in total contaminants.

4. The system of claim 1, wherein:
   the separator is rotary disc screen having a V-shape cross-section, and having at least three adjustable operating parameters including a V-angle, a chute tilt angle and a rotational speed of the rotary discs.

5. The system of claim 1, wherein:
   the separator is an inclined rotary disc screen having at least two adjustable operating parameters including angle of inclination and rotational speed of the rotary discs.

6. The system of claim 5, wherein the adjustable operating parameters also include a flow of air onto a face of the screen.

7. The system of claim 1, further comprising:
   a paper stream separator for receiving the paper stream and separating container contaminants from the paper stream; and
   a container stream separator for receiving the container stream and separating paper contaminants from the container stream; and
   wherein the first detector is associated with the paper stream separator and includes a first sensor for identifying whether each item of the paper stream is paper; and
   wherein the second detector is associated with the container stream separator and includes a second sensor for identifying whether each item of the container stream is a container.

* * * * *